US012619684B1

(12) United States Patent
Bermanis et al.

(10) Patent No.: US 12,619,684 B1
(45) Date of Patent: May 5, 2026

(54) ANOMALY DETECTION USING A SEMI-SUPERVISED LOCALLY ADAPTIVE SIMILARITY KERNEL

(71) Applicant: ThetaRay Ltd., Hod HaSharon (IL)

(72) Inventors: Amit Bermanis, Hod HaSharon (IL);
Amir Averbuch, Hod HaSharon (IL);
David Segev, Hod HaSharon (IL)

(73) Assignee: ThetaRay Ltd., Hod HaSharon (IL)

( * ) Notice: Subject to any disclaimer, the term of this patent is extended or adjusted under 35 U.S.C. 154(b) by 0 days.

(21) Appl. No.: 18/659,612

(22) Filed: May 9, 2024

Related U.S. Application Data

(60) Provisional application No. 63/465,384, filed on May 10, 2023.

(51) Int. Cl.
*G06F 7/00* (2006.01)
*G06F 16/22* (2019.01)
*G06F 18/2433* (2023.01)

(52) U.S. Cl.
CPC ...... *G06F 18/2433* (2023.01); *G06F 16/2264* (2019.01)

(58) Field of Classification Search
CPC ............. G06F 18/2433; G06F 16/2264; G06F 16/283; G06F 17/153; G06F 17/175
See application file for complete search history.

(56) References Cited

U.S. PATENT DOCUMENTS

| | | | | |
|---|---|---|---|---|
| 10,509,695 | B1 * | 12/2019 | Averbuch | G06N 20/00 |
| 10,509,847 | B1 * | 12/2019 | Xu | G06F 17/18 |
| 10,902,062 | B1 * | 1/2021 | Guha | G06F 16/9027 |
| 12,174,689 | B1 * | 12/2024 | Mozaffari | G06N 20/00 |
| 2009/0091443 | A1 * | 4/2009 | Chen | G06F 18/2433 340/540 |
| 2011/0272161 | A1 * | 11/2011 | Kumaran | G01V 1/301 702/179 |

(Continued)

OTHER PUBLICATIONS

Unsupervised Outlier Detection for Mixed-Valued Dataset Based on the Adaptive k-Nearest Neighbor Global Network, Yu Wang, Xuejing Cao, and Yupeng Li, Department of Industrial Engineering, School of Mines, China University of Mining and Technology, Xuzhou 221116, China, Mar. 28, 2022 (Year: 2022).*

(Continued)

*Primary Examiner* — Mohammed R Uddin
(74) *Attorney, Agent, or Firm* — Nathan & Associates Patent Agents Ltd.; Menachem Nathan

(57) ABSTRACT

A method of detecting anomalies in data, includes receiving a dataset with a plurality of multidimensional data points (MDDPs) wherein a portion of the plurality of MDDPs are labeled and wherein other MDDPs of the plurality of MDDPs are unlabeled; based on a neighborhood size k of the plurality of MDDPs, computing a neighborhood radius ox for each MDDP in a reference dataset computed for the plurality of MDDPs; and generating a locally adaptive similarity (LAS) kernel of a newly arrived MDDP (NAMDDP) based on the neighborhood radius ox. The method additionally includes applying a random walk model to the LAS kernel to determine a probability of the NAMDDP being an anomaly; and if the NAMDDP is an anomaly, outputting data associated with an alarm or notification responsive to the detection of the anomaly.

20 Claims, 3 Drawing Sheets

100

(56)  References Cited

U.S. PATENT DOCUMENTS

| | | | | |
|---|---|---|---|---|
| 2012/0041575 A1* | 2/2012 | Maeda | G05B 23/024 | |
| | | | 700/79 | |
| 2015/0058982 A1* | 2/2015 | Eskin | G06F 16/84 | |
| | | | 726/23 | |
| 2016/0202693 A1* | 7/2016 | Noda | G05B 23/0283 | |
| | | | 702/183 | |
| 2018/0004948 A1* | 1/2018 | Martin | H04L 63/1425 | |
| 2018/0248900 A1* | 8/2018 | Keshet | H04L 63/1425 | |
| 2019/0188212 A1* | 6/2019 | Miller | H04L 63/145 | |
| 2020/0053108 A1* | 2/2020 | Cili | G06F 18/2113 | |
| 2021/0334673 A1* | 10/2021 | Butvinik | G06N 20/00 | |
| 2022/0138504 A1* | 5/2022 | Fathi Moghadam | G06N 20/20 | |
| | | | 706/12 | |
| 2022/0284076 A1* | 9/2022 | Lee | G06F 17/175 | |
| 2023/0089481 A1* | 3/2023 | Liu | G06N 3/0455 | |
| | | | 706/15 | |
| 2023/0237260 A1* | 7/2023 | Yoon | G06N 3/0455 | |
| | | | 704/9 | |
| 2023/0334363 A1* | 10/2023 | Bouaziz | G06N 20/00 | |
| 2025/0074303 A1* | 3/2025 | Liu | G06V 20/56 | |

OTHER PUBLICATIONS

Object Recognition with Partially Labeled Examples, Andrew S. Crane, Department of Electrical Engineering and Computer Science . . . Massachusetts Institute of Technology, Sep. 1, 2002 (Year: 2002).*

* cited by examiner

100

Receive $\mathcal{R} = \{r_1, ..., r_N\} \subset \mathbb{R}^n$ a plurality N of multidimensional data points (MDDPs), each data point having n features, a neighborhood size k, labeling $\ell: \mathcal{R} \rightarrow \{-1,0,1\}$                                    102

For each $r \in \mathcal{R}$:
(1) apply KNN (find k nearest neighbors of r)
(2) calculate $\sigma_r$ using EQ. (1)                              104

Generate Neighborhood Function

106

200

Receiving datapoint $x \in \mathbb{R}^n$, reference set $\mathcal{R}$, its labels, neighborhood function (from FIG. 1), and neighborhood size $k$

202

Find $k$ nearest neighbors of $x$ in $\mathcal{R}$

204

Set $\sigma_x$ using EQ. (1)

206

Compute LAS of $x$ using EQ. (2)

208

Compute the normalization term $d(x)$ using EQ. (4)

210

Compute the score $s(x)$ using EQ. (5)

212

1

ANOMALY DETECTION USING A SEMI-SUPERVISED LOCALLY ADAPTIVE SIMILARITY KERNEL

CROSS REFERENCE TO RELATED APPLICATIONS

This application claims the benefit of priority from U.S. Provisional patent application No. 63/465,384 filed May 10, 2023, which is incorporated herein by reference in its entirety.

FIELD

Embodiments disclosed herein relate in general to methods and systems for anomaly detection of anomalies in data by derivation of scoring functions, and in particular to detection of anomalies among multidimensional data points (MDDPs) in a semi-supervised way.

BACKGROUND

Huge amounts of data are generated by many sources. "Data" refers to a collection of information, the result of experience, observation, measurement, streaming, computing, sensing or experiment, other information within a computer system, or a set of premises that may consist of numbers, characters, images, or as measurements of observations.

Static and dynamic "high dimensional big data" (HDBD) are common in a variety of fields. Exemplarily, such fields include finance (e.g., fraud detection, crimes, money laundering, human traffic, terrorist activities), intrusion detection in cybersecurity, insurance, healthcare, streaming, energy, medical diagnosis, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics/ maintenance, social networking, imaging, e-mails, governmental databases, industrial data, aviation, stock market, acoustics, bioinformatics, among many more.

HDBD is a collection of MDDPs. A MDDP, is one unit of data from the original (source, raw) HDBD. A MDDP may be expressed as a combination of numeric, Boolean, integer, floating, binary or real characters. HDBD datasets (or databases) include MDDPs that may be either fixed or may accumulate constantly (dynamic). MDDPs may include (or may be described by) hundreds or thousands of features.

The term "feature" (or "parameter") refers to an individual measurable property of phenomena being observed. A feature may also be "computed", i.e. be an aggregation of different features to derive an average, a median, a standard deviation, etc. "Feature" is also normally used to denote a piece of information relevant for solving a computational task related to a certain application. More specifically, "features" may refer to specific structures ranging from simple structures to more complex structures such as objects. The choice of features in a particular application may be highly dependent on the specific problem at hand. Features can be described in numerical (3.14), Boolean (yes, no), ordinal (never, sometimes, always), or categorical (A, B, O) manner.

SUMMARY

In various embodiments, there is provided a method of detecting anomalies in data, including receiving a dataset with a plurality of multidimensional data points (MDDPs) wherein a portion of the plurality of MDDPs are labeled and wherein other MDDPs of the plurality of MDDPs are unlabeled; based on a neighborhood size k of the plurality of MDDPs, computing a neighborhood radius ox for each MDDP in a reference dataset computed for the plurality of MDDPs; and generating a locally adaptive similarity (LAS) kernel of a newly arrived MDDP (NAMDDP) based on the neighborhood radius $\sigma_x$. The method additionally includes applying a random walk model to the LAS kernel to determine a probability of the NAMDDP being an anomaly; and if the NAMDDP is an anomaly, outputting data associated with an alarm or notification responsive to the detection of the anomaly.

In some embodiments, the computing a neighborhood radius $\sigma_x$ for each MDDP in a reference dataset computed for the plurality of MDDPs based on a neighborhood size k of the plurality of MDDPs, includes receiving the neighborhood size k for the plurality of MDDPs; computing the reference dataset for the plurality of MDDPs; and computing the neighborhood radius $\sigma$, for each MDDP in the reference dataset based on the neighborhood size k.

In some embodiments, the method further includes applying a k-nearest neighbors (KNN) algorithm to each MDDP in the reference dataset for use in the generating of the LAS kernel.

In some embodiments, the method further includes assigning to each MDDP and/or NAMDDP a score that reflects a normality in a probability assignment between 0 and 1 based on a scoring function S. Optionally, a score equal to or approximating 0 is associated with a normal data point, and a score equal to or approximating 1 is associated with an abnormal data point.

In some embodiments, the method further includes assigning values of –1, 0, and 1, to the data points in the reference data set, wherein the value –1 is associated with a normal data point, the value 1 is associated with an abnormal data point, and the value 0 is associated with an unknown data point.

In some embodiments, the LAS kernel is described by a similarity measure S: $\mathbb{R}^n \times \mathbb{R}^n \rightarrow [0,1]$.

In various embodiments, there is provided a computer program product, including a non-transitory tangible storage medium readable by a processing circuit and storing instructions for execution by the processing circuit for detecting anomalies in data, including receiving a dataset with a plurality of multidimensional data points (MDDPs) wherein a portion of the plurality of MDDPs are labeled and wherein other MDDPs of the plurality of MDDPs are unlabeled; based on a neighborhood size k of the plurality of MDDPs, computing a neighborhood radius $\sigma_x$ for each MDDP in a reference dataset computed for the plurality of MDDPs; and generating a locally adaptive similarity (LAS) kernel of a newly arrived MDDP (NAMDDP) based on the neighborhood radius $\sigma_x$. The computer program product additionally provides for the processing circuit applying a random walk model to the LAS kernel to determine a probability of the NAMDDP being an anomaly; and if the NAMDDP is an anomaly, outputting data associated with an alarm or notification responsive to the detection of the anomaly.

In some embodiments, the computer program product provides for the processing circuit computing a neighborhood radius $\sigma_x$ for each MDDP in a reference dataset computed for the plurality of MDDPs based on a neighborhood size k of the plurality of MDDPs, including receiving the neighborhood size k for the plurality of MDDPs; computing the reference dataset for the plurality of MDDPs; and computing the neighborhood radius $\sigma_x$ for each MDDP in the reference dataset based on the neighborhood size k.

In some embodiments, the computer program product provides for the processing circuit applying a k-nearest neighbors (KNN) algorithm to each MDDP in the reference dataset for use in the generating of the LAS kernel. Optionally, the LAS kernel is described by a similarity measure S: $\mathbb{R}^n \times \mathbb{R}^n \rightarrow [0,1]$.

In some embodiments, the computer program product provides for the processing circuit assigning to each MDDP and/or NAMDDP a score that reflects a normality in a probability assignment between 0 and 1 based on a scoring function S. Optionally, a score equal to or approximating 0 is associated with a normal data point, and a score equal to or approximating 1 is associated with an abnormal data point.

In some embodiments, the computer program product provides for the processing circuit assigning values of −1, 0, and 1, to the data points in the reference data set, wherein the value −1 is associated with a normal data point, the value 1 is associated with an abnormal data point, and the value 0 is associated with an unknown data point.

In various embodiments, there is provided a computer system, including a hardware processor configurable for detecting anomalies in data, the computer system configured for receiving a dataset comprising a plurality of multidimensional data points (MDDPs) wherein a portion of the plurality of MDDPs are labeled and wherein other MDDPs of the plurality of MDDPs are unlabeled; based on a neighborhood size k of the plurality of MDDPs, computing a neighborhood radius $\sigma_x$ for each MDDP in a reference dataset computed for the plurality of MDDPs; and generating a locally adaptive similarity (LAS) kernel of a newly arrived MDDP (NAMDDP) based on the neighborhood radius $\sigma_x$. The computer system is further configured for applying a random walk model to the LAS kernel to determine a probability of the NAMDDP being an anomaly; and if the NAMDDP is an anomaly, outputting data associated with an alarm or notification responsive to the detection of the anomaly.

In some embodiments, the computer system is further configured for computing a neighborhood radius $\sigma_x$ for each MDDP in a reference dataset computed for the plurality of MDDPs based on a neighborhood size k of the plurality of MDDPs, including receiving the neighborhood size k for the plurality of MDDPs; computing the reference dataset for the plurality of MDDPs; and computing the neighborhood radius $\sigma_x$ for each MDDP in the reference dataset based on the neighborhood size k.

In some embodiments, the computer system is further configured for applying a k-nearest neighbors (KNN) algorithm to each MDDP in the reference dataset for use in the generating of the LAS kernel. Optionally, the LAS kernel is described by a similarity measure S: $\mathbb{R}^n \times \mathbb{R}^n \rightarrow [0,1]$.

In some embodiments, the computer system is further configured for assigning to each MDDP and/or NAMDDP a score that reflects a normality in a probability assignment between 0 and 1 based on a scoring function S.

In some embodiments, the computer system is further configured for assigning values of −1, 0, and 1, to the data points in the reference data set, wherein the value −1 is associated with a normal data point, the value 1 is associated with an abnormal data point, and the value 0 is associated with an unknown data point.

BRIEF DESCRIPTION OF THE DRAWINGS

For simplicity and clarity of illustration, elements shown in drawings are not necessarily drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
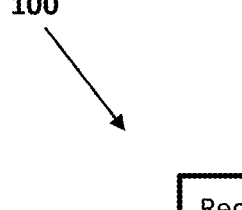
FIG. 1 is a flow chart of an exemplary GLS-based anomaly detection method for computing a neighborhood function and used for training a machine-learning-based (MLB) anomaly detection system.
Figure 1:
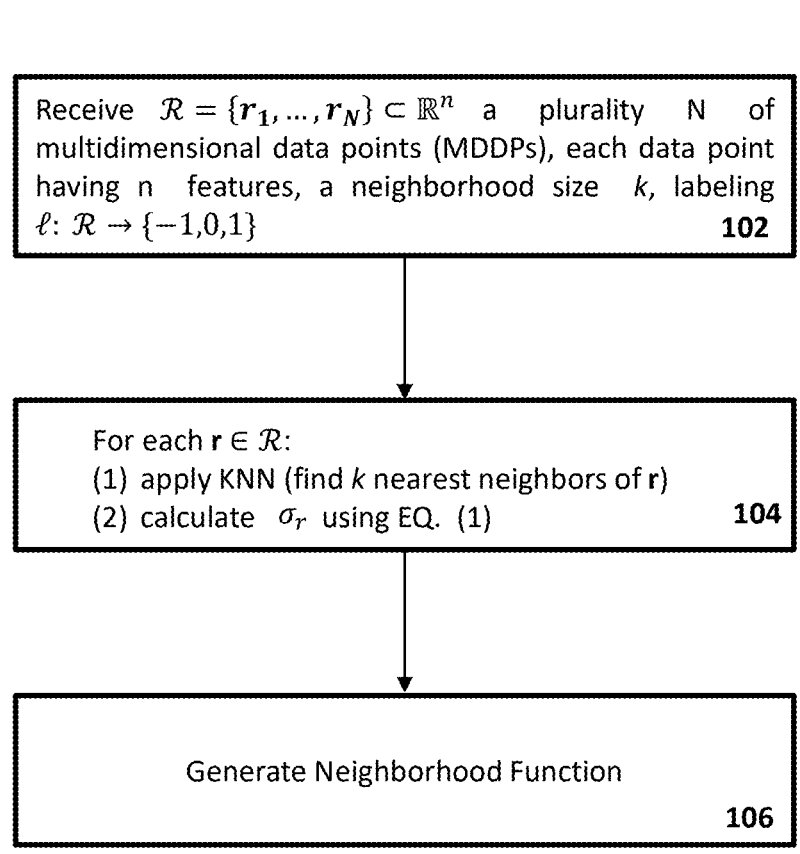

Many of the current methods used to extract useful intelligence from HDBD require extensive computational resources, are time consuming, and, when used for anomaly detection, fail to detect anomalies before they become operational. Therefore, there is a need for, and it would be advantageous to have, anomaly detection methods, and systems implementing these methods, which require less computational effort and are faster. There is also a need for anomaly detection methods and systems that can detect unknown anomalies representing unknown attacks or malfunctions. Consequently, the systems implementing the methods may be required to perform automatic anomaly detection by "unsupervised" or "semi-supervised" methodologies, these methodologies defined by detection that does not require rules, signatures, patterns, domain expertise or semantics understanding of the input data in the unsupervised process and some labels in semi-supervised processing. Furthermore, the detection should be associated with a number of false alarms which is as low as possible.

Machine-learning-based anomaly detection methods generally include two sequential steps: training and detection. The training step (hereinafter may also be referred to as "training phase") may be typically associated with identifying a normal behavior in MDDP training data, defining a distance (affinity or metric) to the training data, and providing some normal characteristic (profile) of the training data. "Training data" is MDDP data of a finite size, used as a source for learning the behavior and the properties of the data. The affinity may be used to compute the deviation of a NAMDDP from the normal data profile. The detection step computes the affinities for the NAMDDP and classifies the NAMDDP as either normal or abnormal. The detection step may also find anomalies in the training data.

Embodiments disclosed herein relate to methods for detection of anomalies among MDDPs and/or NAMDDPs using a semi-supervised based method to generate an anomaly scoring function that classifies whether a training MDDP and/or a NAMDDP is normal or abnormal (anomalous). In a given dataset ("input data"), most of the data is unlabeled and the rest of the data is labeled (semi-supervised). The method provides a scoring function S that assigns to each MDDP and/or NAMDDP a score that reflects a normality in a probability assignment between 0 and 1, with 1 being totally abnormal (anomaly) and 0 being totally normal. A score associated with a particular MDDP or NAMDDP may be compared with a threshold value, for example 0.5, or 0.4, or 0.3, or smaller, or 0.6, or 0.7, or greater. If the score is greater than the threshold value, the MDDP or NAMDDP may be considered to be an anomaly.

In some embodiments, anomaly detection via scoring calculation may be achieved by processing raw data (input data) using a Graph Laplacian Semi-supervised (GLS) based method which includes a semi-supervised Graph Laplacian algorithm applied to anomaly detection. The GLS-based method may include analyzing a single step, random walk over the given data, defined by a Locally Adaptive Similarity (LAS) kernel. The final score of each data point may then be based on its transition probability to the given abnormal subset. That is, given a reference (training) dataset $\mathcal{R} = \{r_1, \ldots, r_N\} \subset \mathbb{R}^n$, the data points may be labeled by $\ell$: $\mathcal{R} \rightarrow \{-1,0,1\}$ where $\ell(r)=1$ if r is a known abnormal data point, $-1$ if it is a known normal datapoint, otherwise $\ell(r)=0$. The objective is to provide a score function $s: \mathbb{R}^n \rightarrow \mathbb{R}$ which assigns high values to datapoints with high likelihood of being abnormal.

The LAS kernel may be described by a pairwise similarity measure $S: \mathbb{R}^n \times \mathbb{R}^n \rightarrow [0,1]$ and may be computed via the reference set R by first computing a neighborhood radius $\sigma_x$ based on its distances to the k nearest neighbors in $\mathcal{R}$:

$$\sigma_x^2 = \text{mean}\{\|x - r\|^2 | r \in KNN(x), r \in \mathcal{R}\} \quad (1)$$

and based on EQ. (1), the similarity may be described by:

$$S(x, y) = \exp\left\{-\frac{\|x - y\|^2}{2\sigma_x^2}\right\} \cdot \exp\left\{-\frac{\|x - y\|^2}{2\sigma_y^2}\right\} \quad (2)$$

disclosed herein. The training data may include an input dataset $\mathcal{R}$ of N MDDPs. The input dataset $\mathcal{R}$ may hereinafter also be referred to as reference set $\mathcal{R}$, reference dataset $\mathcal{R}$, and reference data $\mathcal{R}$. Optionally, the training data may include a portion of the input dataset $\mathcal{R}$ (some of the MDDPs), although for simplicity, method 100 is described with reference to the input dataset $\mathcal{R}$ (and the plurality of N MDDPs). Method 100 may include three steps (102, 104, 106), as described herein below, nevertheless, it is noted that the skilled person may readily implement the method with more steps or less steps, and/or a different sequence of steps.

In step 102, the input data $\mathcal{R}$ may be received and may serve as training data. The input dataset $\mathcal{R}$ may include the plurality of N MDDPs, each MDDP may be expressed as a combination of numeric, Boolean, integer, floating, binary or real characters. The MDDPs may be either static or dynamic and may include n features, optionally hundreds or thousands of features, or more and its labeling $\ell$. Each MDDP in $\mathcal{R}$ may have a neighborhood size k.

In step 104, for each $r \in \mathcal{R}$, the k-nearest neighbors (KNN) algorithm may be applied to each MDDP r and the neighborhood parameters $\sigma_r$ of each MDDP in $\mathcal{R}$ may be computed using EQ. (1).

In step 106, the neighborhood function may be generated. Algorithm 1 below is a schematic description of the Train phase. The notation $T_j$ denotes the subset $\{r \in T | \ell(r)=j\}$ for $j \in \{-1,0,1\}$.

The semi-supervised GLS-based method applied to the training phase may be described by the following exemplary algorithm:

---

Algorithm 1: GLS Train

---

Input: Training set $T \subset \mathbb{R}^N$, its labeling $\ell$: $\mathcal{R} \rightarrow \{-1,0,1\}$, neighborhood size k, sampling size N (step 102)

Output: Neighborhood function $\sigma$: $T \rightarrow \mathbb{R}^+$ (step 106)
if |T| > N then
    set the reference set $\mathcal{R} = T_{-1}$
    if $|T_1| > N/2$ then
      randomly sample a subset $\mathcal{R}_1$ of N/2 elements from $T_1$
    end
    else
        set $\mathcal{R}_1 = T_1$
    end
    $\mathcal{R} \leftarrow \mathcal{R} \cup \mathcal{R}_1$ set n = N − $|\mathcal{R}|$ if n < $T_0$ then
      randomly sample a subset $\mathcal{R}_0$ of n elements from $T_0$
    end
      else
        set $\mathcal{R}_0 = T_0$
      end
        $\mathcal{R} \leftarrow \mathcal{R} \cup \mathcal{R}_0$
end
else
    set the reference set $\mathcal{R} = T$
end
for $r \in \mathcal{R}$ do (step 104)
    find k nearest neighbors of r in $\mathcal{R}$
    for each $r \in \mathcal{R}$ compute $\sigma_r$ following EQ. 1
    end

---

Thus, datapoints are considered similar if they belong to the same area, with respect to the density.

Figure 2:
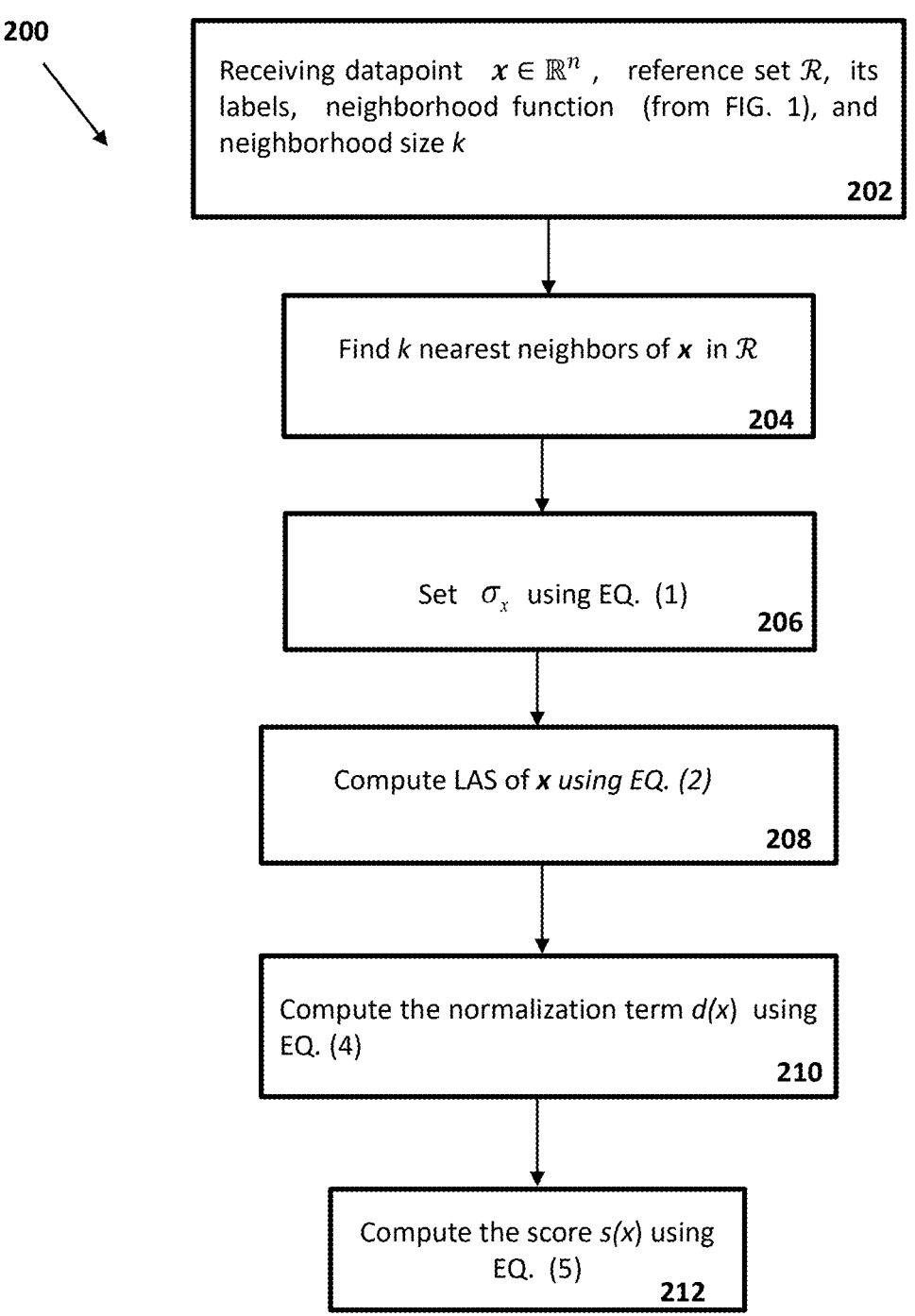
FIG. 2 is a flow chart of an exemplary method of generating a Locally Adaptive Similarity (LAS) kernel and of computing a score function for anomaly detection in MDDPs and newly arrived MDDPs ("NAMDDPs")

Reference is now made to FIG. 1 which is a flow chart of an exemplary GLS-based training method 100 for computing a neighborhood function that is used for training a MLB anomaly detection system, according to an embodiment Reference is now made to FIG. 2 which is a flow chart of an exemplary method 200 of the detection phase of anomalies by generating the Locally Adaptive Similarity (LAS) kernel and computing a score function for each NAMDDPs and optionally, the MDDPs, according to an embodiment disclosed herein. In the exemplary method 200, analyzing of the single-step random walk over the given data may be performed. Method 200 may include six steps (202, 204, 206, 208, 210, 212), as described herein below, nevertheless, it is noted that the skilled person may readily implement the method with more steps or less steps, and/or a different sequence of steps In step 202, input data x∈ ℝ$^n$ may be received which may include NAMDDPs and optionally the MDDPs. Additionally received may be from step 102 in FIG. 1, the reference set ℛ including its labeling ℓ:ℛ→{0,1}, and the neighborhood size k, and from step 106 in FIG. 1, the computed neighborhood function.

In step 204, the k nearest neighbors of x∈ ℝ$^n$ may be found in the reference set ℛ.

In step 206, the neighborhood radius σ$_x$ may then be found using EQ. (1).

In step 208, the LAS kernel for each x∈ ℝ$^n$ may be computed based on the reference set ℛ elements {S(x,r)}$_{r∈}$ ℛ from EQ. (2).

In step 210, the LAS kernel may be analyzed by defining a single-step random walk from ℝ$^n$ into ℛ with the following transition probabilities:

$$P(X_1=r|X_0=x)=d^{-1}(x)S(x,r) \tag{3}$$

where X$_t$ is the state of the random walk X at time t and from EQ. (2). The step may include defining a normalization term, given by:

$$d(x)=\Sigma_{r∈} ℛS(x,r). \tag{4}$$

In step 212, the (abnormality) score function s: ℝ$^n$→[−1,1] may be used to measure the transition probabilities to jump into the abnormal subset based on abnormal labels and to determine the score s(x) which may be given by:

$$s(x)=\Sigma_{\{r|l(r)=1\}}P(x,r)-\Sigma_{\{r|l(r)≠1\}}P(x,r) \tag{5}$$

where the transition probabilities for all non ls labeled points are subtracted.

The semi-supervised GLS-based method applied to the anomaly detection phase may be described by the following exemplary algorithm:
Algorithm 2: GLS Predict/Detect
Input: The outputs of Algorithm 1, neighborhood size k and a datapoint x∈ ℝ$^n$ (step 202)
Output: score function s(x)∈(0,1]
1. Find k nearest neighbors of x in the reference set ℛ (step 204); and set σ$_x$ from EQ. (1) (step 206)
2. Compute the LAS of x in the reference set ℛ elements {S(x,r)}$_{r∈R}$ from EQ. (2) (step 208)
3. Compute the normalization term d(x) from EQ. (4) (step 210)
4. Set the score s(x) using EQ. (5) (step 212)

Figure 3:
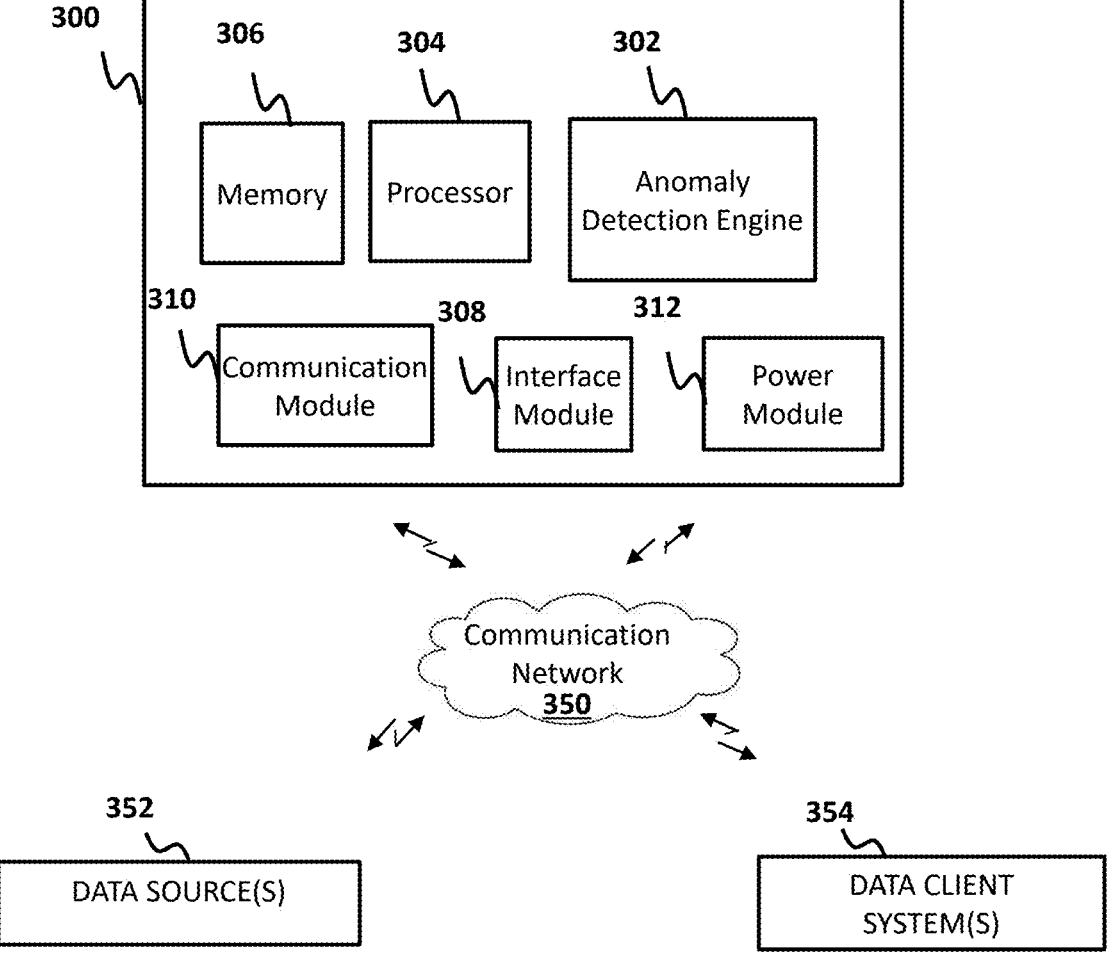
FIG. 3 is a block diagram of an exemplary MLB anomaly detection system configured to implement the methods of FIGS. 1-2.

FIG. 3 is a block diagram of an exemplary MLB anomaly detection system 300 configured to implement the methods of FIGS. 1-2, according to an embodiment disclosed herein. System 300 may include an anomaly detection engine 302, a processor 304, a memory 306, an interface module 308, a communication module 310, and a power module 312. System 300 may be in operable communication with data sources 352 and data client systems 354 over a communication network 350.

Anomaly detection engine 302 may be operative to execute an algorithm associated with the anomaly detection methods of FIGS. 1-2 to classify input data from data sources 352 (training data, MDDPs, and NAMDDPs) into normality or abnormality, and to output data to data client systems 354. Processor 304 may be implemented by various types of processor devices and/or processor architectures including, for example, embedded processors, communication processors, graphics processing unit (GPU), soft-core processors and/or embedded processors, and may control system 300 operations, including its components. Processor 304 may additionally be configured to execute programs stored in memory 306 to enable anomaly detection engine 302 to execute the anomaly detection algorithm. In some embodiments, detection engine 302 may be implemented in processor 304.

Memory 306 may include instructions which, when executed e.g. by processor 304, may cause the execution of a method for detecting an anomaly, optionally methods 100-200 shown in FIGS. 1-2. Memory 306 may include one or more types of computer-readable storage media including, for example, transactional memory and/or long-term storage memory facilities and may function as file storage, document storage, program storage, and/or as a working memory. The latter may, for example, be in the form of a static random access memory (SRAM), dynamic random access memory (DRAM), read-only memory (ROM), cache or flash memory. As long-term memory, memory 306 may, for example, include a volatile or non-volatile computer storage medium, a hard disk drive, a solid state drive, a magnetic storage medium, a flash memory and/or other storage facility. A hardware memory facility may, for example, store a fixed information set (e.g., software code) including, but not limited to, a file, program, application, source code, object code and the like.

Interface module 308 may serve to direct received input data to anomaly detection engine 302. In addition, interface module 308 may provide interfacing capabilities in system 300, as may be required between the different components therein, and as may be required to interface with data sources 352 and data client systems 354 through communication module 310. Power module 312 serves for powering the various components of system 300.

Communication module 310 may, for example, include I/O device drivers (not shown) and network interface drivers (not shown) for enabling the transmission and/or reception of data over communication network 350. Communication module 310 may be used for communicating a notification or alarm related to a detected anomaly. A device driver may, for example, interface with a keypad or a USB port. A network interface driver may, for example, execute protocols for the Internet, or an Intranet, a Wide Area Network (WAN), a Local Area Network (LAN) employing any combination of a wired network, Wireless Local Area Network (WLAN)), a Metropolitan Area Network (MAN), a Personal Area Network (PAN), an Extranet, 2G, 3G, 3.5G, 4G including for example Mobile WIMAX or Long Term Evolution (LTE), Bluetooth®, ZigBee™, near-field communication (NFC) and/or any other current or future communication network, standard, and/or system.

Data sources 352 may include networks, sensors, data warehouses and/or process control equipment, among other sources. Input data provided by data sources 352 may include, for example, historian data, financial data, sensor data, network traffic data, online data, streaming data, databases, production data and/or the like.

Output data may be descriptive of analysis results, e.g., descriptive of anomaly events. In some embodiments, the output data may comprise filtered input data, i.e., input data which is free or substantially free of anomalies. In some embodiments, the output data may comprise an alarm or alarms. In some embodiments, the output data may comprise notifications about an anomaly or anomalies. In some embodiments, the output data may comprise actions responsive to receiving a notification or alarm from communication module 310. An example of responsive actions may include blocking a transaction, optionally a financial transaction, associated with the data containing a detected anomaly. Another example of a responsive action may include visually or audibly alerting a user, for example, by displaying a warning sign on a display or issuing an audible warning signal. Still another example of a responsive action may include quarantining the data containing the detected anomaly for further examination/investigation. Yet another responsive action may include automatically deleting the data containing the anomaly.

Data client systems 354 may include, for example, a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), customer databases, personal digital assistants, a workstation, a wearable device, a handheld computer, a notebook computer, a vehicular device, a stationary device, a controller, and/or a home appliances control system. In some embodiments, data client systems 354 may operationally provide some or all of the input and output data functions described with respect to data sources 352. Optionally, client data systems 354 may receive some or all of the input data from data sources 352 and may communicate the data to system 300. Additionally or alternatively, data client systems may receive some or all of the output data from data sources 352 and/or communication module 310. In some embodiments, actions similar to those described for data sources 352 may be performed responsive to receipt of an anomaly notification or alarm.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein.

The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers.

The terms "non-transitory computer-readable storage device" and "non-transitory machine-readable storage device" encompasses distribution media, intermediate storage media, execution memory of a computer, and any other medium or device capable of storing for later reading by a computer a computer program implementing embodiments of a method disclosed herein. A computer program product can be deployed to be executed on one computer or on multiple computers at one site or distributed across multiple sites and interconnected by a communication network.

All references mentioned in this specification are herein incorporated in their entirety by reference into the specification, to the same extent as if each individual patent was specifically and individually indicated to be incorporated herein by reference. In addition, citation or identification of any reference in this application shall not be construed as an admission that such reference is available as prior art to the present application.

What is claimed is:

1. A method of detecting anomalies in data, comprising:
receiving a dataset comprising a plurality of multidimensional data points (MDDPs) wherein a portion of the plurality of MDDPs are labeled and wherein other MDDPs of the plurality of MDDPs are unlabeled;
based on a neighborhood size k of the plurality of MDDPs, computing a neighborhood radius $\sigma_x$ for each MDDP in a reference dataset computed for the plurality of MDDPs;
generating a locally adaptive similarity (LAS) kernel of a newly arrived MDDP (NAMDDP) based on the neighborhood radius $\sigma x$;
applying a single step random walk model to the LAS kernel to determine a probability of the NAMDDP being an anomaly; and
if the NAMDDP is an anomaly, outputting data associated with an alarm or notification responsive to the detection of the anomaly.

2. The method of claim 1, wherein the computing a neighborhood radius $\sigma_x$ for each MDDP in a reference dataset computed for the plurality of MDDPs based on a neighborhood size k of the plurality of MDDPs, includes:
receiving the neighborhood size k for the plurality of MDDPs;
computing the reference dataset for the plurality of MDDPs; and
computing the neighborhood radius $\sigma$, for each MDDP in the reference dataset based on the neighborhood size k.

3. The method of claim 1, further comprising applying a k-nearest neighbors (KNN) algorithm to each MDDP in the reference dataset for use in the generating of the LAS kernel.

4. The method of claim 1, further comprising assigning to each MDDP and/or NAMDDP a score that reflects a normality in a probability assignment between 0 and 1 based on a scoring function S.

5. The method of claim 4, wherein a score equal to or approximating 0 is associated with a normal data point, and a score equal to or approximating 1 is associated with an abnormal data point.

6. The method of claim 1, further comprising assigning values of −1, 0, and 1 to the data points in the reference data set, wherein the value −1 is associated with a normal data point, the value 1 is associated with an abnormal data point, and the value 0 is associated with an unknown data point.

7. The method of claim 1, wherein the LAS kernel is described by a similarity measure S: $\mathbb{R}^n \times \mathbb{R}^n \to [0,1]$.

8. A computer program product, comprising: a non-transitory tangible storage medium readable by a processing circuit and storing instructions for execution by the processing circuit for performing a method of detecting anomalies in data that includes:

receiving a dataset comprising a plurality of multidimensional data points (MDDPs) wherein a portion of the plurality of MDDPs are labeled and wherein other MDDPs of the plurality of MDDPs are unlabeled;

based on a neighborhood size k of the plurality of MDDPs, computing a neighborhood radius $\sigma_x$ for each MDDP in a reference dataset computed for the plurality of MDDPs;

generating a locally adaptive similarity (LAS) kernel of a newly arrived MDDP (NAMDDP) based on the neighborhood radius $\sigma_x$;

applying a single step random walk model to the LAS kernel to determine a probability of the NAMDDP being an anomaly; and if the NAMDDP is an anomaly, outputting data associated with an alarm or notification responsive to the detection of the anomaly.

9. The computer program product of claim 8, wherein the computing a neighborhood radius $\sigma_x$ for each MDDP in a reference dataset computed for the plurality of MDDPs based on a neighborhood size k of the plurality of MDDPs, includes:

receiving the neighborhood size k for the plurality of MDDPs;

computing the reference dataset for the plurality of MDDPs; and computing the neighborhood radius $\sigma_x$ for each MDDP in the reference dataset based on the neighborhood size k.

10. The computer program product of claim 8, wherein the method further includes applying a k-nearest neighbors (KNN) algorithm to each MDDP in the reference dataset for use in the generating of the LAS kernel.

11. The computer program product of claim 8 wherein the method further includes assigning to each MDDP and/or NAMDDP a score that reflects a normality in a probability assignment between 0 and 1 based on a scoring function S.

12. The computer program product of claim 11, wherein a score equal to or approximating 0 is associated with a normal data point, and a score equal to or approximating 1 is associated with an abnormal data point.

13. The computer program product of claim 8, wherein the method further includes assigning values of −1, 0, and 1 to the data points in the reference data set, wherein the value −1 is associated with a normal data point, the value 1 is associated with an abnormal data point, and the value 0 is associated with an unknown data point.

14. The computer program product of claim 8, wherein the LAS kernel is described by a similarity measure S: $\mathbb{R}^n \times \mathbb{R}^n \geq [0,1]$.

15. A computer system, comprising: a hardware processor configurable to perform a method for detecting anomalies in data that includes:

receiving a dataset comprising a plurality of multidimensional data points (MDDPs) wherein a portion of the plurality of MDDPs are labeled and wherein other MDDPs of the plurality of MDDPs are unlabeled;

based on a neighborhood size k of the plurality of MDDPs, computing a neighborhood radius $\sigma_x$ for each MDDP in a reference dataset computed for the plurality of MDDPs;

generating a locally adaptive similarity (LAS) kernel of a newly arrived MDDP (NAMDDP) based on the neighborhood radius $\sigma_x$;

applying a single step random walk model to the LAS kernel to determine a probability of the NAMDDP being an anomaly; and if the NAMDDP is an anomaly, outputting data associated with an alarm or notification responsive to the detection of the anomaly.

16. The computer system of claim 15, wherein the computing a neighborhood radius $\sigma x$ for each MDDP in a reference dataset computed for the plurality of MDDPs based on a neighborhood size k of the plurality of MDDPs, includes:

receiving the neighborhood size k for the plurality of MDDPs;

computing the reference dataset for the plurality of MDDPs; and computing the neighborhood radius $\sigma_x$ for each MDDP in the reference dataset based on the neighborhood size k.

17. The computer system of claim 15, wherein the method further includes applying a k-nearest neighbors (KNN) algorithm to each MDDP in the reference dataset for use in the generating of the LAS kernel.

18. The computer system of claim 15, wherein the method further includes assigning to each MDDP and/or NAMDDP a score that reflects a normality in a probability assignment between 0 and 1 based on a scoring function S.

19. The computer system of claim 15, wherein the method further includes assigning values of −1, 0, and 1 to the data points in the reference data set, wherein the value −1 is associated with a normal data point, the value 1 is associated with an abnormal data point, and the value 0 is associated with an unknown data point.

20. The computer system of claim 15, wherein the LAS kernel is described by a similarity measure S: $\mathbb{R}^n \times \mathbb{R}^n \rightarrow [0,1]$.

* * * * *